(12) United States Patent
Yokoyama et al.

(10) Patent No.: US 10,458,478 B2
(45) Date of Patent: Oct. 29, 2019

(54) HUB UNIT BEARING AND METHOD OF ASSEMBLING HUB UNIT BEARING

(71) Applicant: NSK LTD., Tokyo (JP)

(72) Inventors: Naoko Nancy Yokoyama, Fujisawa (JP); Masayoshi Shimizuya, Fujisawa (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 16/102,282

(22) Filed: Aug. 13, 2018

(65) Prior Publication Data

US 2019/0048927 A1    Feb. 14, 2019

(30) Foreign Application Priority Data

Aug. 14, 2017  (JP) .................. 2017-156609

(51) Int. Cl.
| | |
|---|---|
| *F16C 43/04* | (2006.01) |
| *F16C 33/46* | (2006.01) |
| *F16C 19/38* | (2006.01) |
| *B60B 27/00* | (2006.01) |
| *F16C 33/58* | (2006.01) |

(52) U.S. Cl.
CPC ............ *F16C 43/04* (2013.01); *F16C 19/385* (2013.01); *B60B 27/001* (2013.01); *F16C 33/4676* (2013.01); *F16C 33/585* (2013.01); *F16C 2326/02* (2013.01)

(58) Field of Classification Search
CPC .............. F16C 2326/02; F16C 43/00; F16C 43/04–065; F16C 33/585; F16C 33/4676; F16C 19/385; B60B 27/001
See application file for complete search history.

(56) References Cited

U.S. PATENT DOCUMENTS

| | | | | |
|---|---|---|---|---|
| 4,203,635 | A * | 5/1980 | Reiter .................. | B60B 27/001 384/560 |
| 4,427,242 | A * | 1/1984 | Otto ..................... | B60B 27/001 384/486 |
| 6,315,457 | B1 * | 11/2001 | Kapaan ................ | B60B 27/001 384/544 |
| 10,054,165 | B2 * | 8/2018 | Dittmar .............. | B60B 27/0078 |

(Continued)

FOREIGN PATENT DOCUMENTS

JP    2005-291499 A    10/2005

*Primary Examiner* — Alan B Waits
(74) *Attorney, Agent, or Firm* — Sughrue Mion, PLLC

(57) ABSTRACT

A hub unit bearing includes: a hub spindle; an inner ring; an outer ring member; a plurality of tapered rollers that are rollably provided between outer circumferential surfaces of the hub spindle and the inner ring and an inner circumferential surface of the outer ring member; a cage including a large-diameter-side annular part, a small-diameter-side annular part; and a sealing device including a metal insert, wherein: the metal insert includes a cylindrical part that is mounted on the inner circumferential surface of the outer ring member and a flange part that radially extends inward from one end of the cylindrical part; and an engaging projection is provided on an outboard side end face of the large-diameter-side annular part of the cage, and an engaging groove engaged with the engaging projection is provided on an inboard side end face of the flange part of the metal insert.

2 Claims, 8 Drawing Sheets

(56) References Cited

U.S. PATENT DOCUMENTS

| | | | | |
|---|---|---|---|---|
| 2002/0085781 A1* | 7/2002 | Ohkuma | ............ | B60B 27/00 384/544 |
| 2007/0025654 A1* | 2/2007 | Shige | ............ | B60B 27/00 384/448 |
| 2009/0046972 A1* | 2/2009 | Umekida | ............ | B60B 27/001 384/571 |
| 2014/0072252 A1* | 3/2014 | Edelmann | ............ | F16C 33/783 384/477 |
| 2014/0346850 A1* | 11/2014 | Shibata | ............ | F16C 33/6633 301/109 |
| 2016/0319875 A1* | 11/2016 | Sguotti | ............ | F16C 43/065 |

* cited by examiner

HUB UNIT BEARING AND METHOD OF ASSEMBLING HUB UNIT BEARING

CROSS-REFERENCE TO RELATED APPLICATION(S)

This application is based upon and claims the benefit of priority from Japanese Patent Application No. 2017-156609, filed on Aug. 14, 2017, the entire contents of which are incorporated herein by reference.

BACKGROUND

1. Field of the Invention

The invention relates to a hub unit bearing that rotatably supports a wheel of a vehicle with respect to a suspension, and a method of assembling the hub unit bearing.

2. Description of the Related Art

Since a wheel of a vehicle such as an automobile is rotatably supported with respect to a suspension, a hub unit bearing is generally used widely. Especially in the case of heavy vehicles, a double-row tapered roller bearing type is adopted as the hub unit bearing. In this case, the hub unit bearing includes a plurality of cages, each of which retains a plurality of tapered rollers, and a sealing devices those block openings of ends of a bearing internal space.

Here, with respect to assembly of this type of hub unit bearing, a method of assembling one of the plurality of cages which is provided at an outboard side (at an outermost side in a vehicle width direction) is described.

First, tapered rollers are rollably assembled to a plurality of pockets of the cage, and a cage assembly of the cage and the tapered rollers is assembled. Next, the cage assembly is concentrically disposed and assembled at an inboard side of an outer ring raceway surface of an outer ring member. After the assembly, a sealing device is inserted and fixed in an internally fitted state at an outboard side end of the outer ring member.

Due to the fixture of the sealing device, the cage assembly is made not to escape from the outer ring member, and an outer ring assembly of the cage assembly, the sealing device, and the outer ring member is assembled. Finally, in the state in which the outer ring assembly is assembled, a hub spindle (an inner ring member) is inserted and concentrically mounted at the inner side of the outer ring member. Thereby, the outer ring member, the cage, the tapered rollers, the sealing device, and the hub spindle enter an assembled state at an outboard side (for example, see JP-A-2005-291499). Afterward, a cage, tapered rollers, and another inner ring member are mounted at an inboard side end.

In the method of assembling a hub unit bearing disclosed in JP-A-2005-291499, in the state in which the cage retains the plurality of tapered rollers (in the state in which the outer ring assembly is assembled), the cage is assembled to the outer ring member, and thus the tapered rollers can be prevented from falling inward in a radial direction in the middle of the assembly process.

However, when the hub spindle is inserted into the outer ring assembly, the outer ring raceway surface and rolling surfaces of the tapered rollers are in a separated state. Thus, concentricity between the outer ring member and the cage assembly is lost in the outer ring assembly, and a relative positional relationship becomes instable. For this reason, the cage assembly comes into contact with an inboard end face of the hub spindle or an edge of a step part of the hub spindle, scratches may occurs at the tapered rollers and the cage, and there is room for improvement on this configuration.

SUMMARY

The invention has been made in view of the above circumstances, and an object thereof is to provide a hub unit bearing capable of, when a hub spindle is inserted into an outer ring assembly in which a cage assembly (an assembly of a cage and tapered rollers) is assembled to an outer ring member with regard to assembly of the cage provided at an outboard side, maintaining concentricity between the outer ring member and the cage assembly, and inhibiting the cage assembly from coming into contact with an inboard end face of the hub spindle or an edge of a step part of the hub spindle, and a method of assembling the hub unit bearing.

According to an aspect of the invention, there is provided a hub unit bearing including: a hub spindle; an inner ring that is fitted onto and fixed to the hub spindle; an outer ring member that is disposed around the hub spindle and the inner ring; a plurality of tapered rollers that are rollably provided between outer circumferential surfaces of the hub spindle and the inner ring and an inner circumferential surface of the outer ring member; a cage that retains the plurality of tapered rollers at an outboard side end at approximately regular intervals in a circumferential direction; and a sealing device that blocks an opening of an end of a bearing internal space at the outboard side end, wherein: the cage includes a large-diameter-side annular part, a small-diameter-side annular part that is disposed concentrically with the large-diameter-side annular part, a plurality of pillar parts that connect the large-diameter-side annular part and the small-diameter-side annular part in an axial direction and are provided at approximately regular intervals in a circumferential direction, and pockets that are formed between the pillar parts adjacent to each other in the circumferential direction and rollably retain the tapered rollers; the sealing device includes an annular metal insert that is fixed to an inner circumferential surface of the outer ring member and a seal member provided on an outboard side end face of the metal insert; the metal insert includes a cylindrical part that is mounted on the inner circumferential surface of the outer ring member and a flange part that radially extends inward from one end of the cylindrical part; and an engaging projection is provided on an outboard side end face of the large-diameter-side annular part of the cage, and an engaging groove engaged with the engaging projection is provided on an inboard side end face of the flange part of the metal insert.

In the above hub unit bearing, the engaging groove may include a bottom wall part, an inner tubular part that extends from an inner end of the bottom wall part in a radial direction, and an outer tubular part that extends from an outer end of the bottom wall part in the radial direction, and a tip of the inner tubular part may support an inside in the radial direction from the centers of large-diameter-side end faces of the tapered rollers.

According to another aspect of the invention, there is provided a method of assembling the above hub unit bearing, the method including: assembling the tapered rollers to the pockets of the cage and assembling a cage assembly of the cage and the plurality of tapered rollers; concentrically assembling the cage assembly with an inner side of the outer ring member at an outboard side end of the outer ring member; and assembling the sealing device to the inner side of the outer ring member at the outboard side end of the outer ring member such that the engaging projection of the large-diameter-side annular part is engaged with the engaging groove of the flange part.

According to the hub unit bearing of the invention, the engaging projection is provided on the outboard side end face of the large-diameter-side annular part of the cage at the outboard side end, and the engaging groove engaged with the engaging projection is provided on the inboard side end face of the flange part of the metal insert. Thus, with regard to the assembly of the cage provided at the outboard side, after the cage assembly (the assembly of the cage and the tapered rollers) is concentrically disposed and assembled inside the outer ring member, when the sealing device is inserted inside the outer ring member, the engaging projection of the large-diameter-side annular part is engaged with the engaging groove of the flange part. For this reason, when the hub spindle is inserted into the outer ring assembly obtained by assembling the cage assembly to the outer ring member, concentricity between the outer ring member and the cage assembly can be maintained, and the cage assembly can be inhibited from coming into contact with an inboard end face of the hub spindle or an edge of the step part of the hub spindle. Thereby, it is possible to prevent scratches from occurring at the tapered rollers and the first cage.

BRIEF DESCRIPTION OF THE DRAWINGS

The present invention will become more fully understood from the detailed description given hereinbelow and the accompanying drawing which is given by way of illustration only, and thus is not limitative of the present invention and wherein.

DETAILED DESCRIPTION OF THE INVENTION

Hereinafter, embodiments of a hub unit bearing according to the invention will be described based on the drawings.

First Embodiment

First, a first embodiment of the hub unit bearing according to the invention will be described with reference to FIGS. 1 to 6. The hub unit bearing of the embodiment is a double-row tapered roller bearing type hub unit bearing for a driven wheel.

Figure 1:
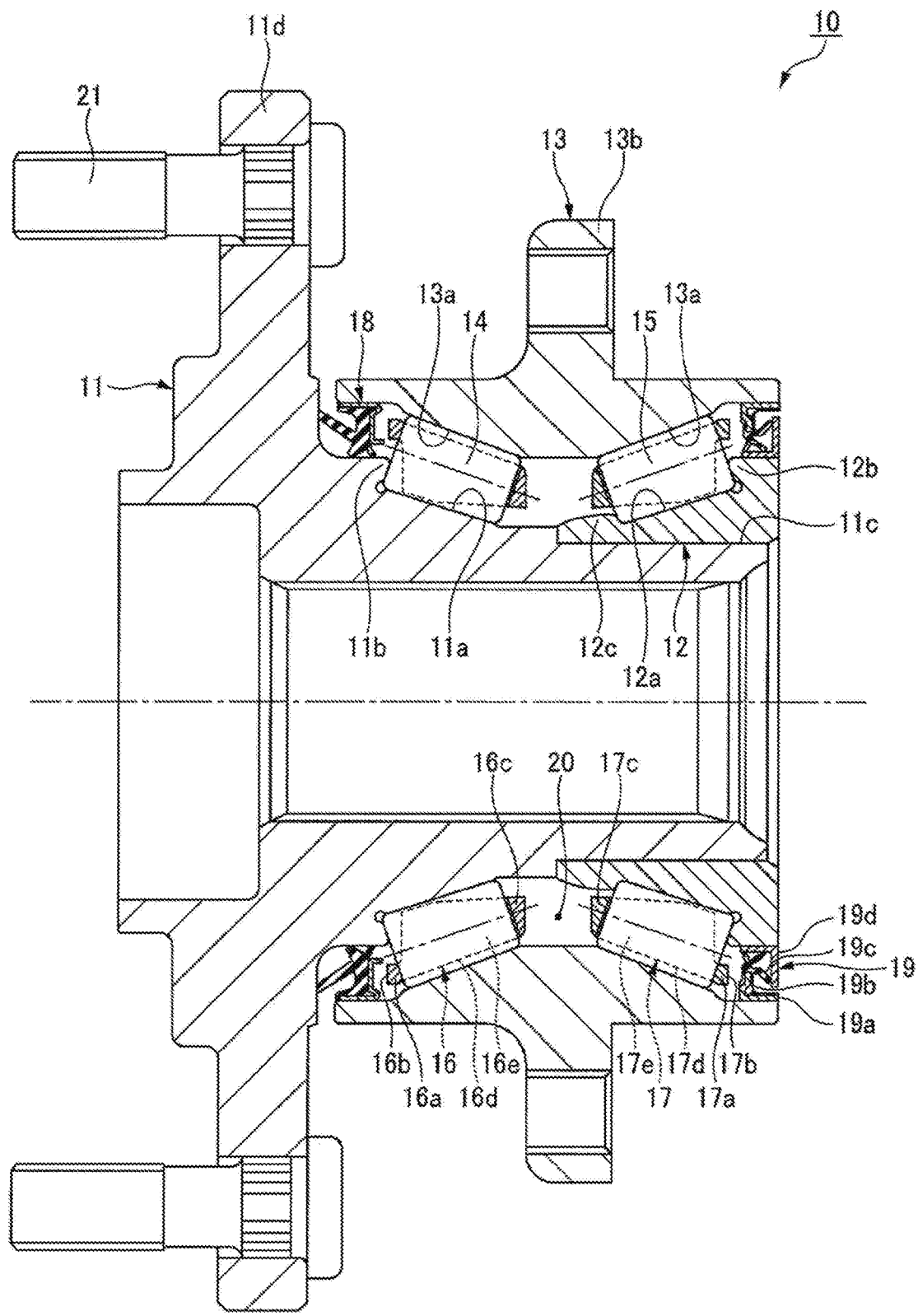
FIG. 1 is a sectional view illustrating a first embodiment of a hub unit bearing according to the invention.
Figure 2:
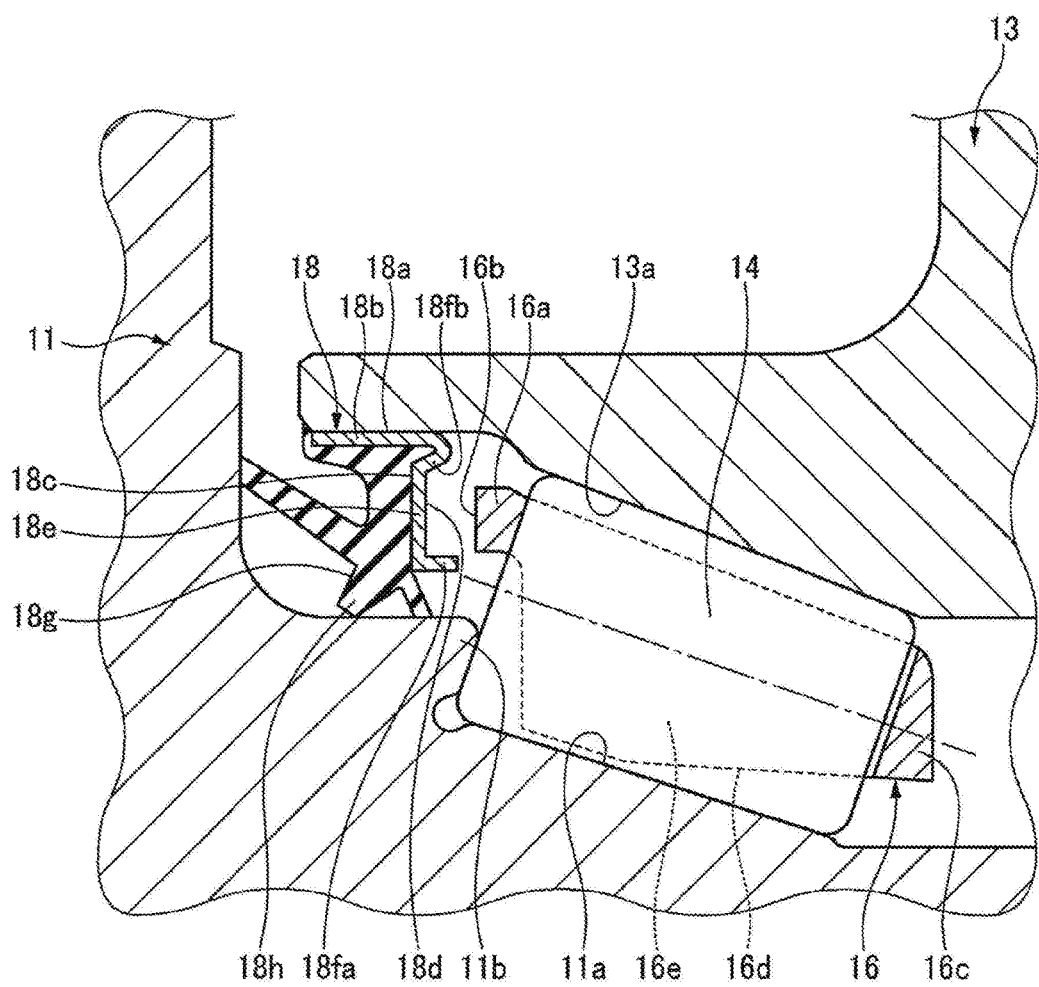
FIG. 2 is an enlarged sectional view around a first cage and a first sealing device illustrated in FIG. 1.

As illustrated in FIGS. 1 and 2, the hub unit bearing 10 of the embodiment includes a hub spindle 11 that is an inner ring member, an inner ring 12 that is fitted onto and fixed to the hub spindle 11, an outer ring member 13 that is disposed around the hub spindle 11 and the inner ring 12, first and second rows of tapered rollers 14 and 15 that are rollably provided between outer circumferential surfaces of the hub spindle 11 and the inner ring 12 and an inner circumferential surface of the outer ring member 13, first and second cages 16 and 17 that retain the first and second rows of tapered rollers 14 and 15 respectively at approximately regular intervals in a circumferential direction, and first and second sealing devices 18 and 19 that block openings of opposite ends of a bearing internal space 20 over the entire circumference.

The hub spindle 11 is a hollow member having an approximately cylindrical shape, and includes a first inner ring raceway surface 11a formed at a middle portion (the left and right middle in FIG. 1) of the outer circumferential surface thereof in an axial direction in a taper convex shape. A stepped back face rib 11b is provided at an outboard side end (the left side in FIG. 1) of the first inner ring raceway surface 11a. A small-diameter step part 11c is formed at an inboard side end (the right side in FIG. 1) of the hub spindle 11 in a circumferential direction. An outer circumferential surface of the small-diameter step part 11c is formed concentrically with the hub spindle 11. A flange part 11d, which radially extends outward from the outer circumferential surface of the hub spindle 11, is formed at the outboard side end of the hub spindle 11. A plurality of hub bolts 21 for fastening a hub spindle and a brake rotor (not illustrated) are provided at the flange part 11d at approximately regular intervals in a circumferential direction.

The inner ring 12 includes a back face rib 12b provided at the inboard side end, and a front face rib 12c provided at the outboard side end, is fitted onto the small-diameter step part 11c of the hub spindle 11, and is fixedly coupled to the hub spindle 11. A second inner ring raceway surface 12a is formed on the outer circumferential surface of the inner ring 12 between the back face rib 12b and the front face rib 12c in a taper convex shape. An inclination direction of the second inner ring raceway surface 12a and an inclination direction of the first inner ring raceway surface 11a are opposite to each other.

The outer ring member 13 is fitted into a holding hole of a knuckle fixed to a vehicle body (not illustrated). A knuckle flange 13b provided on an outer circumferential surface of the outer ring member 13 is fastened to the knuckle (not illustrated) by bolts, and thereby the outer ring member 13 is fixedly coupled to the knuckle (not illustrated). Double-rows of outer ring raceway surfaces 13a and 13a having a taper concave shape are formed on the inner circumferential surface of the outer ring member 13 to correspond to the first and second inner ring raceway surfaces 11a and 12a. Inclination directions of the double-rows of outer ring raceway surfaces 13a and 13a are opposite to each other in conformity with the first and second inner ring raceway surfaces 11a and 12a.

The first and second rows of tapered rollers 14 and 15, which are rollably retained by the first and second cages 16 and 17, are disposed on the raceway surface made up of the first and second inner ring raceway surfaces 11a and 12a and the double-row outer ring raceway surfaces 13a and 13a. The first row of tapered rollers 14 are arranged between the first inner ring raceway surface 11a of the hub spindle 11 and the outer ring raceway surface 13a of the outer ring member 13 in a state of being rollably retained by the first cage 16. The second row of tapered rollers 15 are arranged between the second inner ring raceway surface 12a of the inner ring 12 and the outer ring raceway surface 13a of the outer ring member 13 in a state of being rollably retained by the second cage 17.

The first and second cages 16 and 17 are generally formed in an approximately tapered tubular shape by injection molding of a synthetic resin, and include large-diameter-side annular parts 16a and 17a, small-diameter-side annular parts 16c and 17c that are disposed concentrically with the large-diameter-side annular parts 16a and 17a, a plurality of pillar parts 16d and 17d that connect the large-diameter-side annular parts 16a and 17a and the small-diameter-side annular parts 16c and 17c in an axial direction and are provided at approximately regular intervals in a circumferential direction, and pockets 16e and 17e that are formed between the pillar parts 16d and 17d that are adjacent to each other in a circumferential direction and rollably retain the tapered rollers 14 and 15 respectively. The first cage 16 retains the first row of multiple tapered rollers 14 at the outboard side end. The second cage 17 retains the second row of multiple tapered rollers 15 at the inboard side end.

Outer circumferential surfaces of the pillar parts 16d and 17d of the first and second cages 16 and 17 are disposed outside pitch circles of the first and second rows of tapered rollers 14 and 15 in a radial direction, and inner circumferential surfaces of the pillar parts 16d and 17d are disposed inside the pitch circles of the first and second rows of tapered rollers 14 and 15 in a radial direction.

Widths of an outer diameter side opening and an inner diameter side opening in the pockets 16e and 17e of the first and second cages 16 and 17 in a circumferential direction are smaller than outer diameters of the first and second rows of tapered rollers 14 and 15. For this reason, the first and second rows of tapered rollers 14 and 15 are retained in the pockets 16e and 17e of the first and second cages 16 and 17 without falling off.

In the embodiment, to use the first and second cages 16 and 17 in common, diameters of inner circumferences of the pockets 16e and 17e are regulated to an inner diameter in an assembly of the second cage 17 and the second row of tapered rollers 15 which can pass through the front face rib 12c of the inner ring 12 while being deformed at small diameter sides of the first and second rows of tapered rollers 14 and 15.

As illustrated in FIG. 2, an engaging projection 16b is integrally provided on an outboard side end face of the large-diameter-side annular part 16a of the first cage 16 over the entire circumference. To be specific, the engaging projection 16b is provided such that the large-diameter-side annular part 16a of the first cage 16 directly extends toward the outboard side in an axial direction. In the embodiment, to use the first and second cages 16 and 17 in common, an engaging projection 17b is also provided on the large-diameter-side annular part 17a of the second cage 17 in the same way.

As illustrated in FIGS. 1 and 2, a first sealing device 18 is disposed between an outboard side end of the outer ring member 13 and the outboard side end of the hub spindle 11. The first sealing device 18 includes an annular metal insert 18a that is press-fitted and fixed to an inner circumferential surface of the outboard side end of the outer ring member 13, and an elastic seal part (a seal member) 18g that is formed of a rubber, is attached to a surface of the metal insert 18a which is located at the outboard side, and includes three seal lips 18h.

The metal insert 18a of the first sealing device 18 is provided by bending a metal sheet in an approximate L-shaped cross section, and includes a cylindrical part 18b that is mounted on the inner circumferential surface of the outer ring member 13, and a flange part 18c that radially extends inward from one end of the cylindrical part 18b. The cylindrical part 18b of the metal insert 18a is fitted onto the inner circumferential surface of the outer ring member 13 by an interference fit, and is fixed to the outboard side end of the outer ring member 13.

A groove-like engaging groove 18d is provided at an inboard side end of the flange part 18c of the metal insert 18a of the first sealing device 18 over the entire circumference by stamping or the like. The engaging groove 18d is formed in an approximately rectangular cross section, and includes a bottom wall part 18e, an inner tubular part 18fa that extends at an approximately right angle from an inner end of the bottom wall part 18e in a radial direction to the inside (the inboard side) thereof in an axial direction, and an outer tubular part 18fb that extends at an approximately right angle from an outer end of the bottom wall part 18e in a radial direction to the inside (the inboard side) thereof in an axial direction. A width dimension between the inner tubular part 18fa and the outer tubular part 18fb of the engaging groove 18d in a radial direction is set to be loosely fitted at the time of engagement with the engaging projection 16b of the first cage 16.

In a state in which the hub unit bearing 10 is assembled, the engaging projection 16b of the first cage 16 and the engaging groove 18d of the first sealing device 18 are not engaged with each other, and are disposed apart from each other at a position at which they are overlapped in an axial direction (see FIG. 2). Although will be described below, the engaging projection 16b of the first cage 16 and the engaging groove 18d of the first sealing device 18 are temporarily engaged for the purpose of improving assembly accuracy of the hub unit bearing 10 in the middle of an assemble processing of the hub unit bearing 10 (see FIG. 4).

The seal lips 18h of the first sealing device 18 are in slide contact with the outer circumferential surface of the outboard side end of the hub spindle 11, and the first sealing device 18 blocks an opening between the outboard side ends of the outer ring member 13 and the hub spindle 11.

As illustrated in FIG. 1, a second sealing device 19 is disposed between the inboard side ends of the outer ring member 13 and the inner ring 12. The second sealing device 19 includes an annular metal insert 19a that is press-fitted and fixed to an inner circumferential surface of the inboard side end of the outer ring member 13, an elastic seal part 19b that is formed of a rubber, is attached to a surface of the metal insert 19a which is located at the inboard side, and includes three seal lips 19c, and an annular slinger 19d that is press-fitted and fixed to an outer circumferential surface of the inboard side end of the inner ring 12.

The seal lips 19c of the second sealing device 19 are in slide contact with the slinger 19d, and the second sealing device 19 blocks an opening between the inboard side ends of the outer ring member 13 and the inner ring 12.

For this reason, the bearing internal space 20 of the hub unit bearing 10 is blocked at the opposite ends in an axial direction by the first and second sealing devices 18 and 19, and the first and second sealing devices 18 and 19 prevent an enclosed lubricant from leakage to the outside, and prevent various foreign materials such as rainwater, mud, dust, and so on, that exist outside from intrusion into the bearing internal space 20.

Next, an assembly process (an assembling method) of the hub unit bearing 10 configured in this way will be described with reference to FIGS. 3 to 6.

Figure 3:
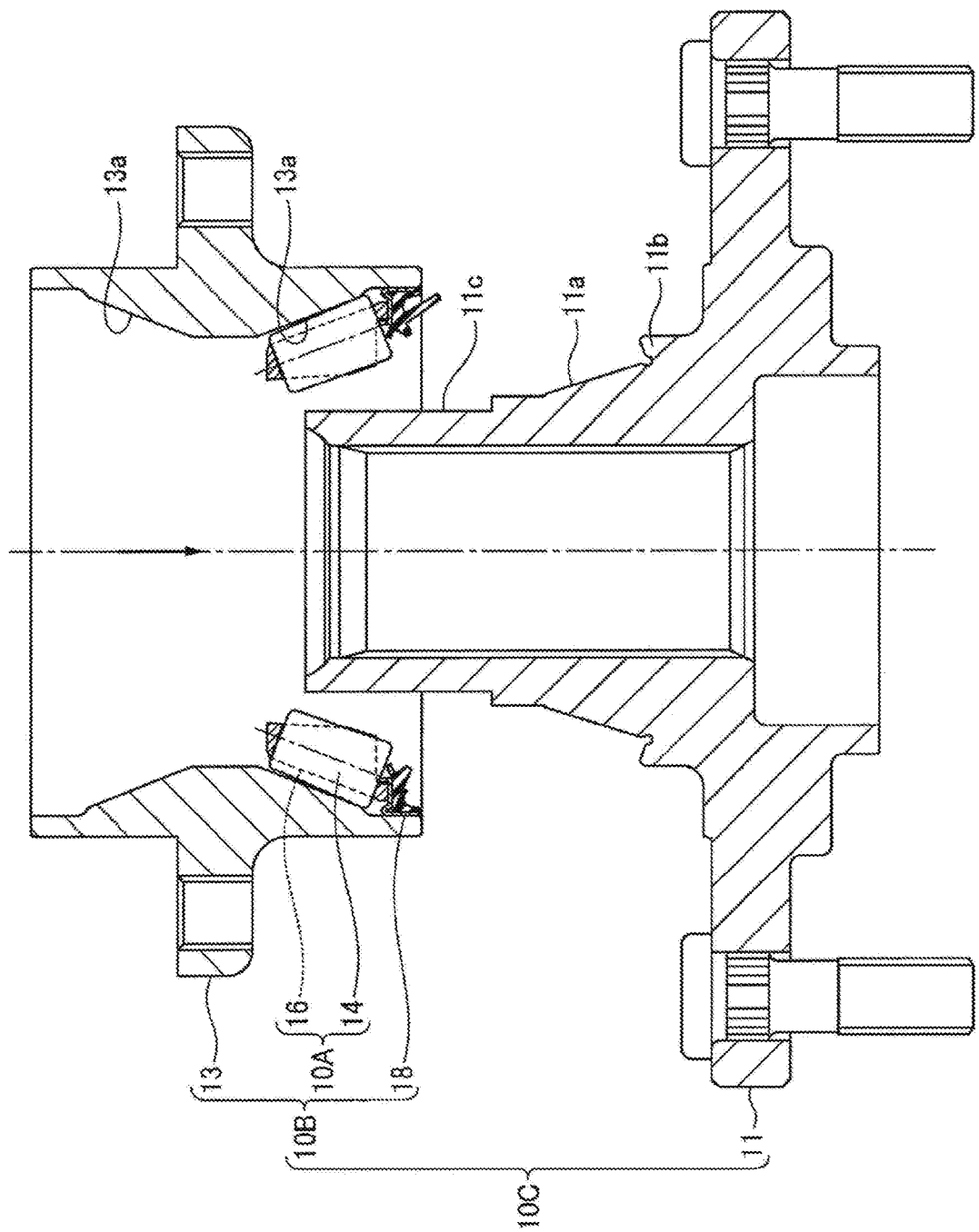
FIG. 3 is a sectional view illustrating a process of assembling an outer ring assembly illustrated in FIG. 1 to a hub spindle.

First, the first row of tapered rollers 14 are assembled to the pockets 16e of the first cage 16, and a cage assembly 10A of the first cage 16 and the first row of tapered rollers (the multiple tapered rollers) 14 is assembled (see FIG. 3). To be specific, the first row of tapered rollers 14 are stored in the pockets 16e of the first cage 16, respectively, while the first row of tapered rollers 14 are pushed into the pockets 16e from the outside of the first cage 16 in a radial direction to elastically deform the pillar parts 16d of the first cage 16 in a circumferential direction. Thereby, the cage assembly 10A of the first cage 16 and the first row of tapered rollers 14 enters an assembled state.

When the first row of tapered rollers 14 are stored in the pockets 16e of the first cage 16, the pillar parts 16d that are adjacent to each other in a circumferential direction are elastically deformed in a direction in which they are separated in a circumferential direction, and allow passage of the first row of tapered rollers 14. For this reason, the first row of tapered rollers 14 are retained in the pockets 16e of the first cage 16 without falling off.

Next, the outer ring member 13 is set with the outboard side end directed upward, and is assembled by concentrically inserting the cage assembly 10A into the inside of the outer ring raceway surface 13a of the outer ring member 13 (see FIG. 3). When assembled to the outer ring member 13, the cage assembly 10A is assembled such that rolling surfaces of the first row of tapered rollers 14 come into contact with the outer ring raceway surface 13a of the outer ring member 13.

Figure 4:
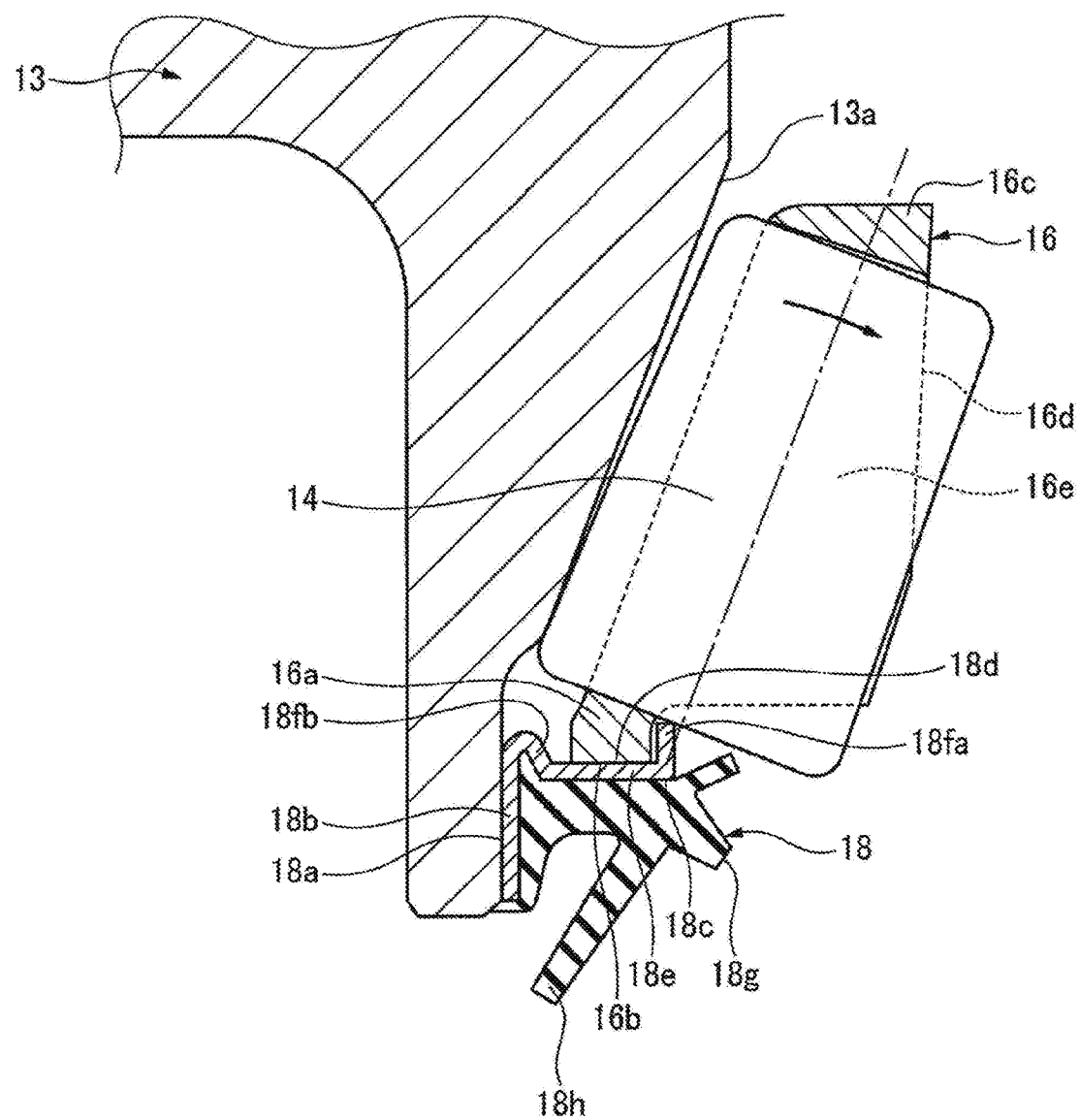
FIG. 4 is an enlarged sectional view around the first cage and the first sealing device in the state of FIG. 3.

Next, as illustrated in FIGS. 3 and 4, the first sealing device 18 is concentrically inserted inside the outer ring member 13, and the first sealing device 18 is internally fitted onto and fixed to the inner circumferential surface of the outer ring member 13. Thereby, an outer ring assembly 10B of the cage assembly 10A, the first sealing device 18, and the outer ring member 13 enters an assembled state. The outer ring assembly 10B is made to take a posture in which a side close to the first sealing device 18 is set to a lower side and an axial direction thereof corresponds to the direction of gravity. Thereby, the engaging projection 16b of the first cage 16 enters the engaging groove 18d of the first sealing device 18 at the outboard side end of the outer ring member 13, and the engaging projection 16b of the first cage 16 comes into contact with the bottom wall part 18e of the engaging groove 18d of the first sealing device 18.

In this case, the engaging projection 16b of the first cage 16 and the engaging groove 18d of the first sealing device 18 are engaged in a loosely fitted state. For this reason, displacement of the engaging projection 16b of the first cage 16 in a radial direction is regulated by the inner tubular part 18fa and the outer tubular part 18fb of the engaging groove 18d. Due to this engagement relationship, the cage assembly 10A does not escape from the outer ring member 13, and is made to maintain concentricity with respect to the outer ring member 13.

Next, as illustrated in FIG. 3, the hub spindle 11 is placed on a predetermined stand such that an axial direction thereof corresponds to the direction of gravity. In this placed state, the outer ring assembly 10B is inserted from an upper side of the hub spindle 11 in an axial direction, and is concentrically mounted. In this case, large-diameter-side end faces of the first row of tapered rollers 14 of the cage assembly 10A come into contact with the back face rib 11b of the hub spindle 11, so that displacement thereof in an axial direction is regulated. Due to this regulation, the engagement relationship between the engaging projection 16b of the first cage 16 and the engaging groove 18d of the first sealing device 18 is released, and the engaging projection 16b and the engaging groove 18d are separated at a position at which they are overlapped in an axial direction (see FIG. 5). Thereby, a hub spindle assembly 10C of the outer ring assembly 10B and the hub spindle 11 enters an assembled state.

Next, in a state in which the second row of tapered rollers 15 are assembled to the pockets 17e of the second cage 17, the inner ring 12 is inserted inside the second cage 17, and the inner ring 12 is concentrically mounted. Thereby, an inner ring assembly 10D of the second cage 17, the second row of tapered rollers 15, and the inner ring 12 enters an assembled state (see FIG. 5).

Figure 5:
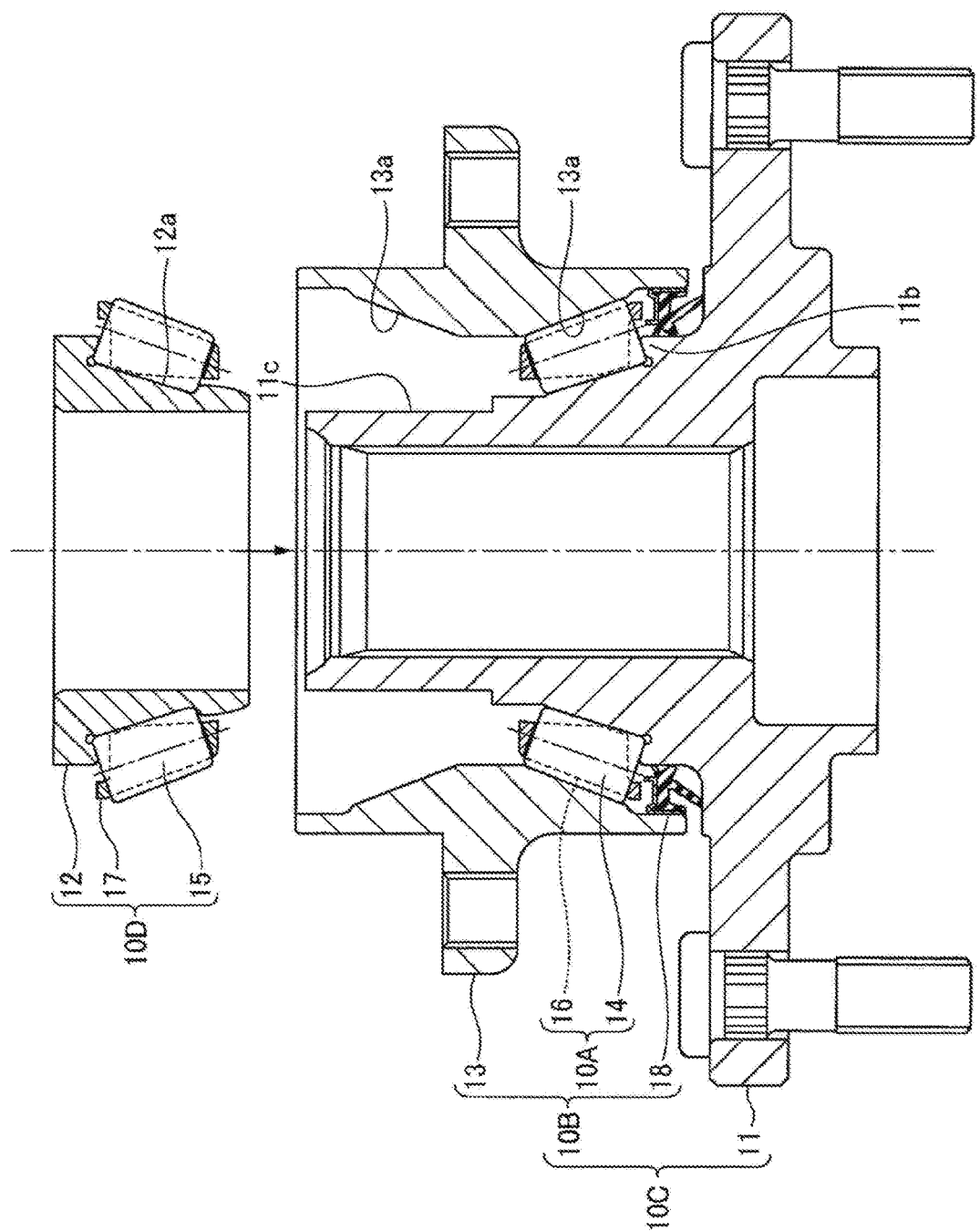
FIG. 5 is a sectional view illustrating a process of assembling an inner ring assembly to a hub spindle assembly.
Figure 6:
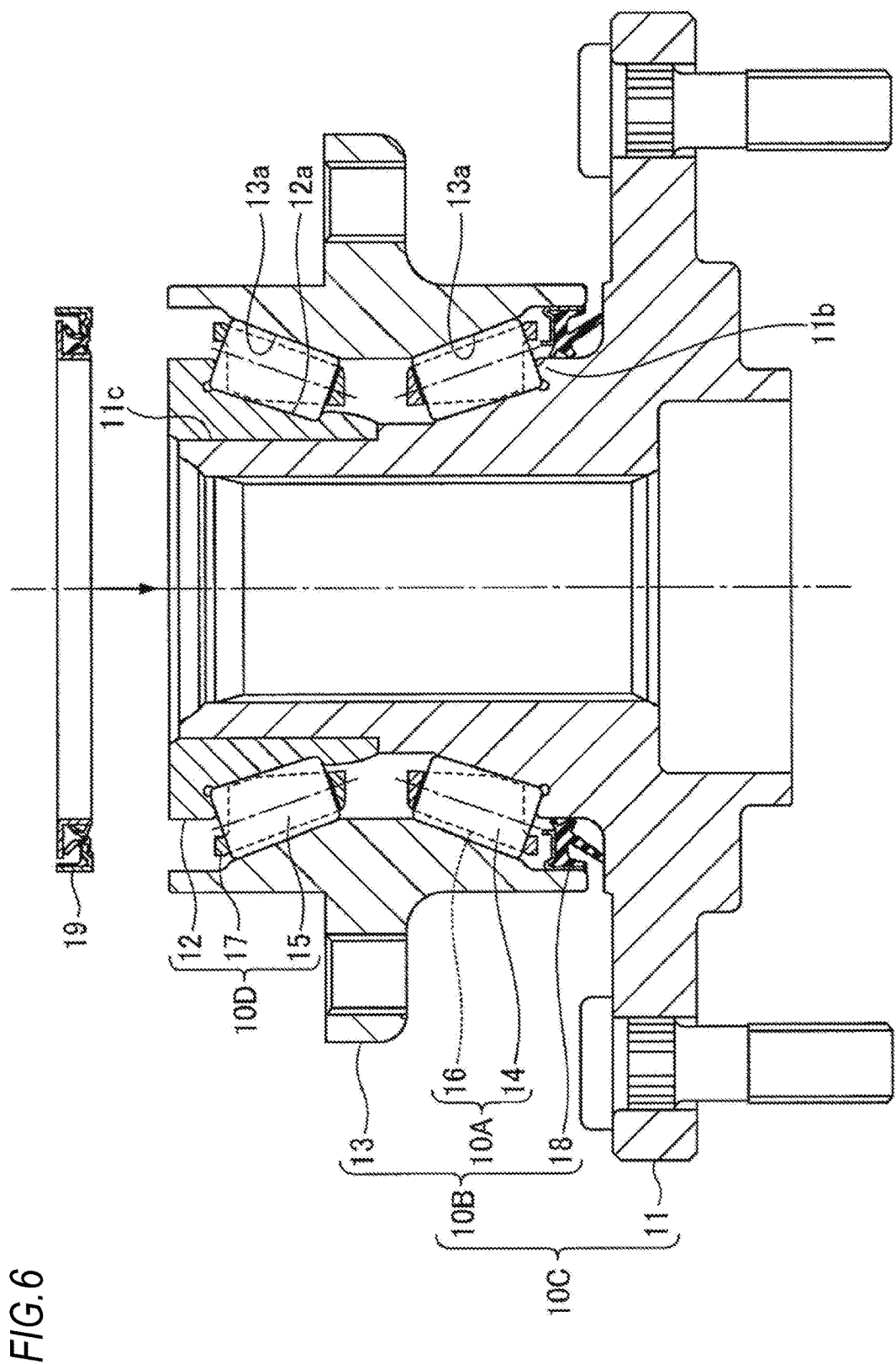
FIG. 6 is a sectional view illustrating a process of assembling a second sealing device to an assembly of the hub spindle assembly and the inner ring assembly.

Next, as illustrated in FIG. 5, the inner ring assembly 10D is inserted into the hub spindle assembly 10C from above in an axial direction, and the inner ring assembly 10D is fitted onto and fixed to the small-diameter step part 11c of the hub spindle 11. Next, as illustrated in FIG. 6, the second sealing device 19 is inserted into the outer ring member 13 at the inboard side end, and the second sealing device 19 is fitted into and fixed to the outer ring member 13 and the inner ring 12. The assembly of the hub unit bearing 10 is completed via this series of processes.

As described above, according to the hub unit bearing 10 of the embodiment, the engaging projection 16b is provided on the outboard side end face of the large-diameter-side annular part 16a of the first cage 16 at the outboard side end, and the engaging groove 18d engaged with the engaging projection 16b is provided on the inboard side end face of the flange part 18c of the metal insert 18a of the first sealing device 18. Thus, with regard to the assembly of the first cage 16 provided at the outboard side, after the cage assembly (the assembly of the first cage 16 and the first row of tapered rollers 14) 10A is concentrically disposed and assembled inside the outer ring member 13, when the first sealing device 18 is inserted inside the outer ring member 13, the engaging projection 16b of the large-diameter-side annular part 16a is engaged with the engaging groove 18d of the flange part 18c. For this reason, when the hub spindle 11 is inserted into the outer ring assembly 10B obtained by assembling the cage assembly 10A to the outer ring member 13, concentricity between the outer ring member 13 and the cage assembly 10A can be maintained, and the cage assembly 10A can be inhibited from coming into contact with an inner end face of the hub spindle 11 or an edge of the step part of the hub spindle 11. Thereby, it is possible to prevent scratches from occurring at the first row of tapered rollers 14 and the first cage 16.

Modification of the First Embodiment

Next, a modification of the first embodiment according to the invention will be described with reference to FIG. 7.

Figure 7:
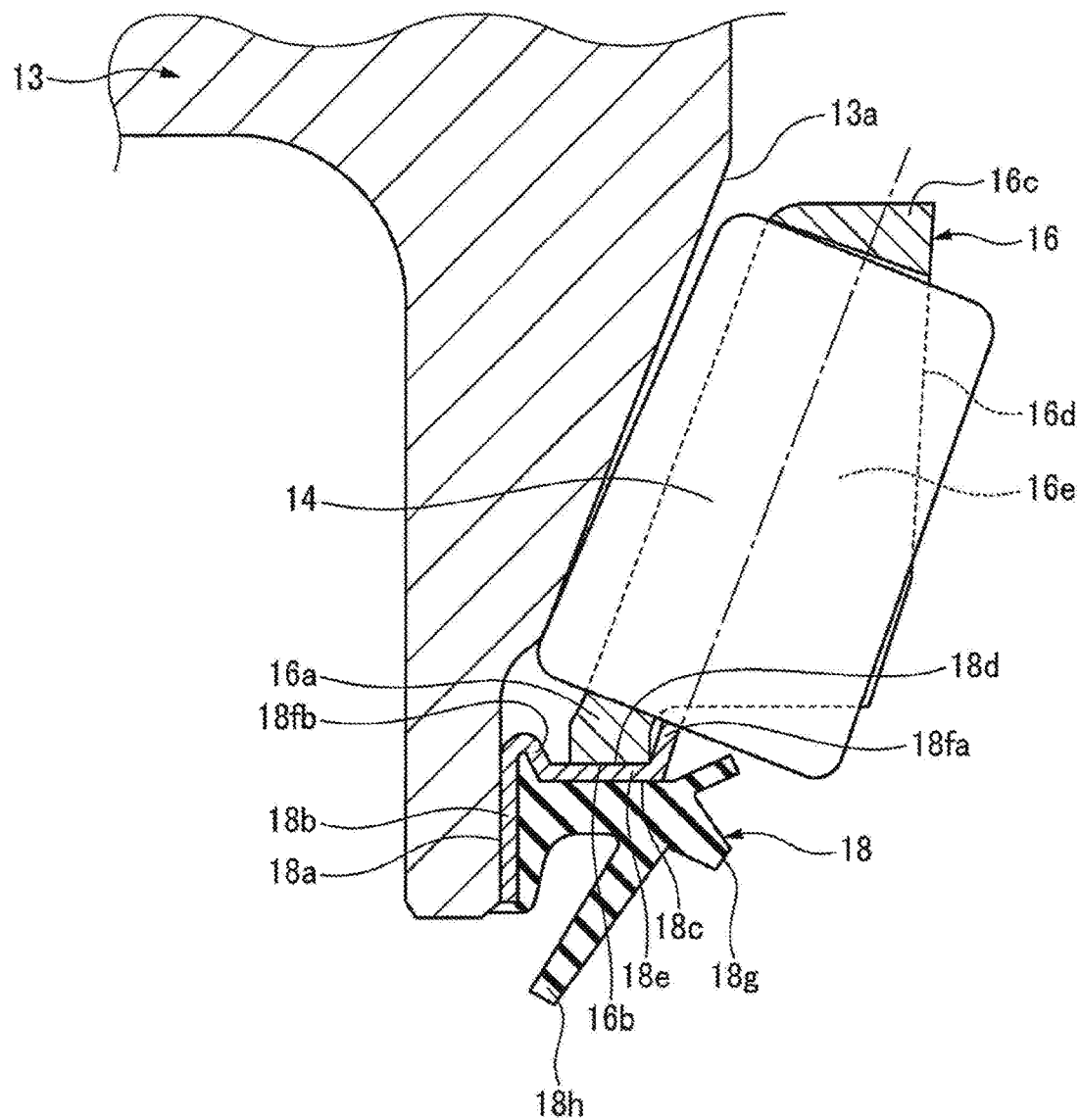
FIG. 7 is an enlarged sectional view illustrating a modification of the hub unit bearing of the first embodiment.

In this modification, as illustrated in FIG. 7, the engaging groove 18d of the flange part 18c of the first sealing device 18 is formed in an approximately trapezoidal cross section. For this reason, the inner tubular part 18fa and the outer tubular part 18fb of the engaging groove 18d are inclined to be separated from each other in a radial direction toward the inside in an axial direction.

As described above, according to the hub unit bearing 10 of this modification, since the inner tubular part 18fa and the outer tubular part 18fb of the engaging groove 18d are inclined to be separated from each other in a radial direction toward the inside in an axial direction, when the engaging projection 16b of the first cage 16 is engaged with the engaging groove 18d, the inner tubular part 18fa and the outer tubular part 18*fb* guide the engaging projection 16*b* of the first cage 16 to the engaging groove 18*d*. Therefore, the inner tubular part 18*fa* and the outer tubular part 18*fb* of the first sealing device 18 have a centering function of the first cage 16. For this reason, concentricity between the outer ring member 13 and the cage assembly 10A can be easily obtained.

Second Embodiment

Next, a second embodiment of the hub unit bearing according to the invention will be described with reference to FIG. 8. Portions identical or equivalent to those of the first embodiment are given the same reference signs in the drawings, and description thereof will be omitted or simplified.

First, before a specific configuration of the embodiment is described, a technical meaning of the embodiment is described with reference to FIG. 4.

In the assembly process of the hub unit bearing 10 of the first embodiment, as illustrated in FIG. 4, the engaging projection 16*b* of the first cage 16 and the engaging groove 18*d* of the first sealing device 18 are engaged in a loosely fitted state. However, since axial lengths and diameters of the first row of pockets 16*e* are larger than those of the first row of tapered rollers 14, and since the first row of pockets 16*e* are obliquely provided, small-diameter-side portions of the first row of tapered rollers 14 in the outer ring assembly 10B fall inward in a radial direction (see an arrow of FIG. 4), and the outer ring raceway surface 13*a* of the outer ring member 13 and small-diameter sides of the rolling surfaces of the first row of tapered rollers 14 may be in a state of being spaced apart from each other. Since large-diameter-side portions of the tapered rollers 14 are held at inner-diameter sides of the pillar parts 16*d* of the first cage 16, the large-diameter-side portions of the tapered rollers 14 are prevented from being displaced to the inner-diameter sides.

In this case, since incircle diameters of the first row of tapered rollers 14 are reduced in the outer ring assembly 10B, when the hub spindle 11 is inserted into the outer ring assembly 10B, the first row of tapered rollers 14 come into contact with the inner end face or the edge of the step part of the hub spindle 11, and scratches may occur at the first row of tapered rollers 14 and the first cage 16.

Figure 8:
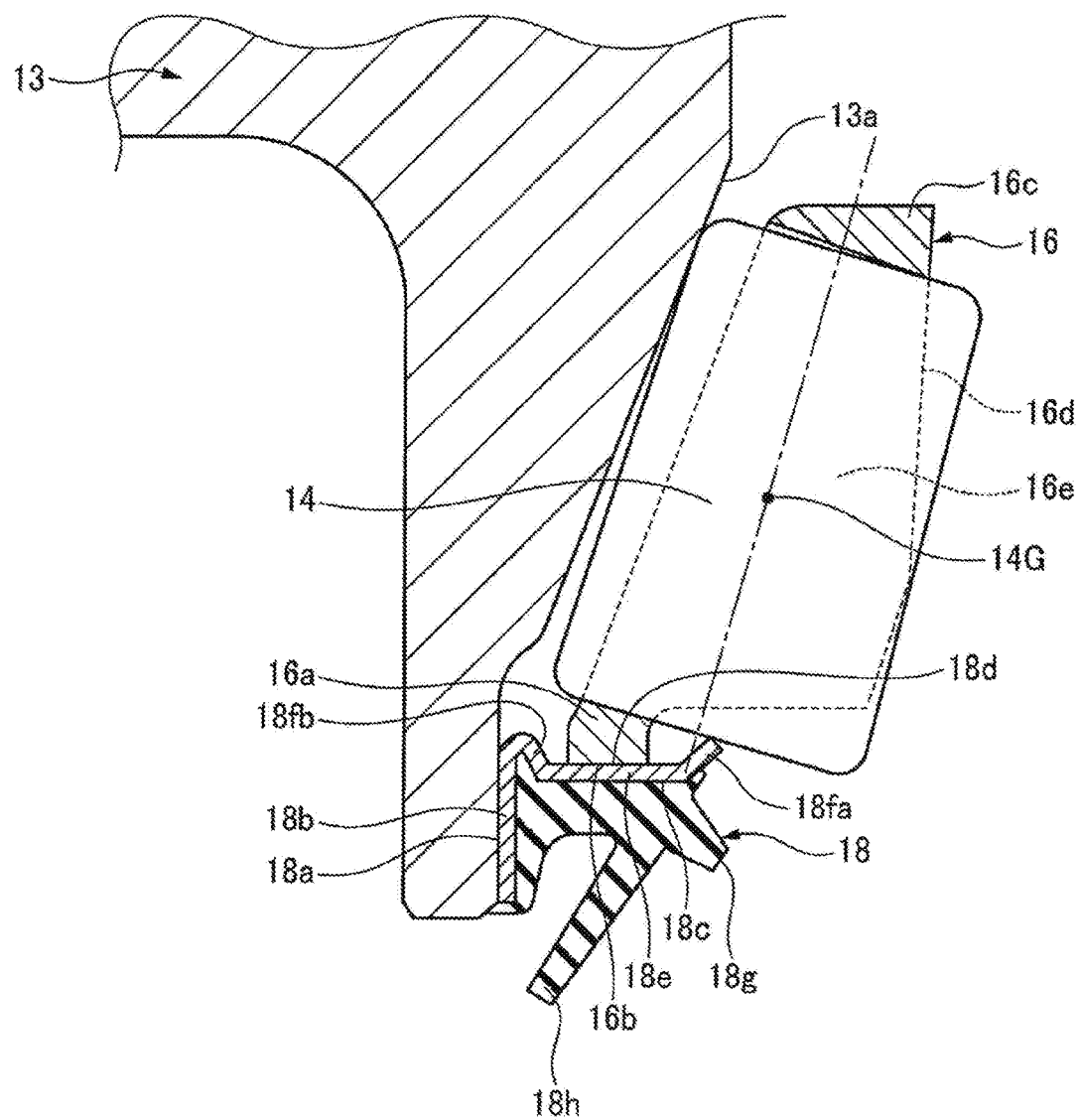
FIG. 8 is an enlarged sectional view illustrating a second embodiment of the hub unit bearing.

In the embodiment, to prevent the aforementioned inward falling of the first row of tapered rollers 14, as illustrated in FIG. 8, the inner tubular part 18*fa* of the metal insert 18*a* of the first sealing device 18 obliquely extends inward in a radial direction and inward in an axial direction, and the inside in the radial direction from the centers of the large-diameter-side end faces of the first row of tapered rollers 14 is supported at a tip of the inner tubular part 18*fa*. Therefore, the inner tubular part 18*fa* of the metal insert 18*a* functions as a roller support that prevents the inward falling of the first row of tapered rollers 14. Since the incircle diameters of the first row of tapered rollers 14 can be made as large as possible by preventing the inward falling of the first row of tapered rollers 14, the contact with the hub spindle 11 is prevented, so that the scratches can be further prevented from occurring at the first row of tapered rollers 14 and the first cage 16. Furthermore, the inside in the radial direction from the centers of gravity 14G of the first row of tapered rollers 14 is supported at the tip of the inner tubular part 18*fa*, which is more preferred because postures of the tapered rollers 14 are further stabilized.

As described above, according to the hub unit bearing 10 of the embodiment, the inner tubular part 18*fa* of the metal insert 18*a* of the first sealing device 18 obliquely extends inward in a radial direction and inward in an axial direction, and the inside in the radial direction from the centers of the large-diameter-side end faces of the first row of tapered rollers 14 is supported at the tip of the inner tubular part 18*fa*, so that the inward falling of the first row of tapered rollers 14 can be prevented. Therefore, the concentricity between the outer ring member 13 and the cage assembly 10A can be maintained, and the scratches can be further prevented from occurring at the first row of tapered rollers 14 and the first cage 16.

The other configurations and operations and effects are the same as in the first embodiment.

The invention is not limited to the examples illustrated in the embodiments, and can be appropriately modified without departing the gist of the invention.

For example, in the embodiments, the example in which the invention is applied to the double-row tapered roller bearing type hub unit bearing has been described. However, without being limited thereto, the invention may be applied to three-or-more-row tapered roller bearing type hub unit bearings.

In the embodiments, the first cage 16 and the second cage 17 are the same components. However, since the engaging projection 17*b* for the second cage 17 is not used, the second cage 17 may be a cage having a different shape. However, in this case, since a possibility of erroneous assembly occurs, the first cage 16 and the second cage 17 are preferably the same components.

What is claimed is:
1. A hub unit bearing comprising:
a hub spindle corresponding to an inner ring member, the hub spindle having an inner ring raceway surface have a taper convex shape and a back face rib;
an inner ring that is fitted onto and fixed to the hub spindle, the inner ring including a back face rib and a front face rib;
an outer ring member that is disposed around the hub spindle and the inner ring;
a plurality of tapered rollers that are rollably provided between outer circumferential surfaces of the hub spindle and the inner ring and an inner circumferential surface of the outer ring member;
a cage that retains the plurality of tapered rollers at an outboard side end at approximately regular intervals in a circumferential direction; and
a sealing device that blocks an opening of an end of a bearing internal space at the outboard side end, wherein:
the cage includes a large-diameter-side annular part, a small-diameter-side annular part that is disposed concentrically with the large-diameter-side annular part, a plurality of pillar parts that connect the large-diameter-side annular part and the small-diameter-side annular part in an axial direction and are provided at approximately regular intervals in a circumferential direction, and pockets that are formed between the pillar parts adjacent to each other in the circumferential direction and rollably retain the tapered rollers, wherein an outer circumferential surface of the pillar parts is disposed on an outside pitch circle of the row of the tapered rollers in a radial direction, and the large-diameter-side annular part of the cage extends toward the outboard side end in the axial direction;
the sealing device includes an annular metal insert that is fixed to an inner circumferential surface of the outer ring member and a seal member provided on an outboard side end face of the metal insert;

the metal insert includes a cylindrical part that is mounted on the inner circumferential surface of the outer ring member and a flange part that radially extends inward from one end of the cylindrical part;

an engaging projection is provided on an outboard side end face of the large-diameter-side annular part of the cage, and an engaging groove engaged with the engaging projection is provided on an inboard side end face of the flange part of the metal insert;

the engaging groove includes a bottom wall part, an inner tubular part that extends from an inner end of the bottom wall part in a radial direction, and an outer tubular part that extends from an outer end of the bottom wall part in the radial direction;

a tip of the inner tubular part supports an inside in the radial direction from the centers of large-diameter-side end faces of the tapered rollers; and the inner tubular part and the outer tubular part of the engaging groove are each inclined to extend from each other in a radial direction toward the inside in an axial direction.

2. The hub bearing unit of claim 1, wherein the inner tubular part of the engaging groove supports the inside in the radial direction from the centers of the large-diameter-side end faces of a first row of tapered rollers.

* * * * *